United States Patent [19]

Duryea

[11] Patent Number: 4,820,576

[45] Date of Patent: Apr. 11, 1989

[54] FIRE RETARDANT POLYMER RESIN

[75] Inventor: Harold E. Duryea, Saco, Me.

[73] Assignee: Fiber Materials, Inc., Biddeford, Me.

[21] Appl. No.: 157,483

[22] Filed: Feb. 18, 1988

[51] Int. Cl.⁴ .......................... B32B 7/00; C08G 8/00; C08K 3/38; C08K 3/40
[52] U.S. Cl. ..................... 428/246; 428/247; 428/255; 428/269; 428/283; 428/921; 521/85; 521/103; 521/136; 521/181; 521/907; 523/219; 524/876; 528/138; 528/155; 528/156
[58] Field of Search ............... 428/246, 247, 255, 269, 428/283, 921; 521/85, 103, 136, 181, 907; 523/219; 524/876; 528/138

[56] References Cited

U.S. PATENT DOCUMENTS

| 4,275,170 | 6/1981 | McAllister et al. | 521/103 |
| 4,309,527 | 1/1982 | McAllister et al. | 521/103 |
| 4,409,361 | 10/1983 | McAllister et al. | 521/99 |
| 4,471,089 | 9/1984 | McAllister et al. | 521/82 |

*Primary Examiner*—William J. Van Balen
*Attorney, Agent, or Firm*—Schiller, Pandiscio & Kusmer

[57] ABSTRACT

A flame-retardant polymer is created by forming a first resin typically by reacting resorcinol with furfural in a ratio of one mole of the former to less than a mole of the latter in the presence of an alkaline catalyst. A resole is then formed by reacting typically phenol with formaldehyde in a ratio of one mole of phenol to more than a mole of the aldehyde in the presence of an alkaline catalyst. The first resin and resole are mixed together with a powered oxyborate compound such as zinc borate and allowed to polymerize to form the polymer.

14 Claims, No Drawings

FIRE RETARDANT POLYMER RESIN

The present invention relates to flame retardant polymer resins, and particularly to novel synthetic thermosettable resins with both superior fire retardant and mechanical properties.

Various synthetic thermosetting resins are known in the art to possess fire retardant properties. Such resins are in demand for a number of applications, for example as foams used typically in thermal insulating materials, as matrix material for composites incorporating reinforcing fibers such as fiberglass, carbon and boron fibers, and for other uses usually in a high heat environment. Substantial efforts have been made to develop such resins. For example, it has been suggested that the incorporation of phosphorous and halogen-containing additives into polyurethane and polystyrene-based foams will reduce their flammability. While the resulting foams may be self-extinguishing, they tend to produce toxic fumes and often unacceptable levels of smoke when exposed to open flame. Moreover, some of the pyrolysis products of polystyrene- and polyurethane-based foams are themselves flammable and can cause flash fires when restricted to a closed area.

Polymer foams based on polyimides, polybenzimidazoles, polyphenylguinox lines, pyrrones and other highly aromatic polymers have been proposed for thermal insulating systems, but none appear to have been commercially acceptable probably because of the extremely high raw materials cost. Polymer foams based on ureaformaldehyde are relatively inexpensive, can be foamed in situ and have generally good mechanical properties, but tend to produce excessive smoke on exposure to flame and tend to degrade in the presence of moisture. Some foams based on phenolformaldehyde also possess good mechanical properties, are stable in the presence of moisture and generate little smoke on exposure to flame, but suffer from afterglow or punking. The condensation reaction product of a phenol and an aldehyde, such as resorcinol and furfural, cured in the presence of boric acid, organic acids, mineral acids or amine compounds, as disclosed in U.S. Pat. Nos. 4,409,361, 4,275,170, 4,309,527 and 4,471,089, is used to fabricate various foams, coatings and fiberreinforced plastic composites. While these products are characterized by low flame spread, low smoke generation and resistance to afterglow, they tend to be extremely brittle and produce reinforced composites and foams with poor mechanical properties. Further, once these resins have been catalyzed, they exhibit a short shelf life at ambient temperatures.

Further, prepolymer resins based on monomeric mixtures of furfural and resorcinol are difficult to control due to loss of the furfural monomer during B-stage drying, leading to a residual resin content of variable composition. The resulting prepolymer also tends to become very tacky during storage and is therefore difficult to handle.

It is thus a primary object of the present invention to provide new and improved synthetic polymers that overcome problems above-noted in the prior art. Another object of the present invention is to provide new and improved thermosetting polymers that can be easily processed into foams, coatings and as a matrix for composite materials, all of which have excellent fire retardant and mechanical properties. Specifically, another object of the present invention is to provide such polymers which are characterized in having low flame spread, low smoke generation, resistance to afterglow or punking, and also have improved mechanical properties such as tensile, shear, compressive and flexural strength. Yet another object of the present invention is to provide a novel process for producing such new and improved polymers. Still other objects of the present invention will in part appear obvious and will in part appear hereinafter.

The invention accordingly comprises the processes involving the several steps and relative order of one or more of such steps with respect to each other, and the materials and products possessing the features, properties and relation of elements, all of which are exemplified in the following detailed disclosure and the scope of the application of which will be indicated in the claims.

Generally to effect the foregoing and other objects, in the practice of the present invention, new resins based upon phenol-aldehyde are derived from a two-part formulation. The latter comprises part A, a low viscosity and low molecular weight condensation polymer formed by a base-catalyzed reaction of moieties of a first aldehyde and a polyhydric phenol present in molar excess. The two-part formulation also includes part B, a low-viscosity, low-molecular weight condensation polymer formed by a base-catalyzed reaction of moieties of a second phenol and a second aldehyde, the latter providing an excess of aldehyde functionality. In a preferred embodiment of the present invention, part A is formed with resorcinol as the polyhydric phenol and furfural as the aldehyde; part B is formed from phenol and formaldehyde. In such case it will be seen that part A alone is not a true thermosetting resin; the addition of hexamethylenetetramine, for example, will cure the resin but the product has poor mechanical properties, particularly extreme brittleness. Part B is itself a true thermosetting resole in that it can be cured to an insoluble and infusible state by applying heat. In any event, parts A and B remain unreacted with one another until mixed together with a quantity of a comminuted oxyboron mineral or compound, such as zinc borate, and cured by heating for a time and to a temperature sufficient to form the final product of the present invention.

For a fuller understanding of the nature and objects of the present invention, reference should be had to the following detailed description. As used herein, "part A" and "part B" have been employed solely for convenience to distinguish the initial aldehyde/polyhydric phenol base-condensation reaction product from the aldehyde/phenol resole.

To prepare part A, an aldehyde and a polyhydric phenol are mixed together in a ratio of one mole of the polyhydric phenol with less than one mole of the aldehyde. To this mixture is added sufficient base to catalyze the condensation polymerization of the aldehyde and polyhydric phenol to form a relatively low molecular weight, low viscosity liquid linear polymer having a molar excess of phenol. Part B of the formulation is prepared by mixing together an aldehyde and a phenol in a ratio of one mole of phenol with more than a mole of aldehyde together with sufficient base to catalyze a condensation reaction to produce a true resole. The end product of the present invention is produced by mixing together parts A and B in a wide ratio and adding a comminuted oxyboron compound. The resulting mixture is heated at a temperature in the range of between about 175° F. to 350° F. for sufficient time to effect a cure. It is believed that curing takes place by cross-linking through condensation of methylol groups from part B with the aromatic hydrogens present in part A, the reaction being catalyzed by the residual catalysts evolved in the original preparation of parts A and B. Complete polymerization is a time/temperature dependent process. Typically at 350° F. the mixture takes about 20 minutes to polymerize, but at 175° F. complete polymerization would require about 3 to 5 hours. The polymerization rate also can be varied by varying the amounts of base catalysts in parts A and B.

The novel polymer of the present invention may be formed as a foam by incorporating known foaming agents such as $CO_2$ and fluorocarbon gases in known manner. The polymer may also be cast as foamed board stock or foamed in situ, applied as a coating, or incorporated in a laminate or as a matrix for a reinforced composite material.

More specifically, the aldehydes useful in part A are particularly furfural and mixtures of formalin or paraformaldehyde and furfural, although it is to be noted that a post addition of formaldehyde (either as paraformaldehyde or formalin) in an amount such that there is a molar excess of aldehyde present, will cause the part A resin to gel after standing at room temperature for about 16 hours or more. The polyhydric phenols useful in part A are particularly resorcinol and substituted resorcinols, to which minor amounts of other phenols such as orth, meta and paracresols, 3,5 dimethylphenol and the like can be added.

Aldehydes useful in forming the resole of part B are particularly formaldehyde, formalin, acetaldehyde, acrolein and other aldehydes substituted in the alpha position. The phenols useful in forming the resole include phenol, substituted phenols such as xylenol, the cresols and the like.

The base catalysts useful in forming both part A and part B of the formulation of the present invention include alkalis generally, particularly aqueous solutions of NaOH, KOH, $Ba(OH)_2$, $NH_4OH$, and a number of primary, secondary and tertiary amines including the methylamines and ethanolamines.

The particulate oxyboron compounds or minerals are added to the mixture of parts A and B in a weight percentage range of between 3 to 20% of the final product (preferably about 10%). Any of a large number of oxyboron compounds and minerals such as borax, boracite, calcium borate, zinc borate, and other ortho, pyro and metaborates are useful as additives in the present invention.

When incorporated as a matrix material, either foamed or unfoamed, for a reinforced composite, the polymer of the present invention may be mixed with a wide range of reinforcing materials. Such materials include, but are not limited to, fiberglass, Kevlar, carbon, cellulosics such as cotton and paper and most textile fibers generally except nylons, the resulting fire retardant values, of course, being somewhat altered by the nature of the reinforcing material.

The following examples, intended to be illustrative and not limiting, provide an additional description of the present invention in which all parts and percentages are by weight, and viscosity was measured by the Gardner-Holt method:

EXAMPLE 1

A charge was prepared as follows:

| | |
|---|---|
| Anhydrous methanol (1) | 14.87% |
| Sodium hydroxide (25% alkali in water) | 1.616% |
| Resorcinol | 40.331% |
| Furfural | 29.875% |
| Anhydrous methanol (2) | 13.308% |

Part A of the present formulation was prepared by charging together in a 2-liter flask equipped with an agitator, reflux condenser, dropping funnel and thermometer, the anhydrous methanol (1) and the aqueous sodium hydroxide solution, and then introducing the resorcinol. The mixture was heated to reflux at about 96° C., the furfural was added dropwise over one hour and the mixture maintained in reflux for 2 more hours. Methanol (2) was then added and the mixture allowed to cool to room temperature. Upon sampling the discharge, the specifications were solids 65–66%, viscosity (@ 25° C.) V–Y, and all furfural had reacted.

A second charge was prepared as follows:

| | |
|---|---|
| Phenol | 56.828% |
| Water | 12.261% |
| Barium hydroxide (octahydrate) | 2.273% |
| Paraformaldehyde (95% powder) | 28.638% |

Part B of the present formulation was formed from this second charge by mixing the phenol and water with agitation, adding the barium hydroxide and mixing for 30 minutes. The paraformaldehyde was then added and the mixture heated to about 60° C. On reaching 60° C., external heat was removed and the exotherm was allowed to coast to 100+2° C. Cooling was applied to hold the mixture at 100+1° C. for 30 minutes after first reaching the 100° C. level. The mixture was then allowed to cool to room temperature and the specification checked to show solids 68–70%, viscosity (@ 25° C.) I–N, pH 7.4–7.7, free formaldehyde 1% max., water tolerance 20–50%, and gel time at 121° C. 10–13 minutes.

The two resin components, part A and part B, of the present invention possess increased storage stability due to the stoichiometry of the reactants employed and the base-catalyzed reaction in the manufacture of part A in which all of the furfural is reacted. Part A should be stable indefinitely when stored at room temperature.

Several mixtures of the two resins, part A and part B, were studied on a parts by weight (solids) basis to determine cure characteristics which are given by the following table:

| Resin Blend | A | B | C | D | E |
|---|---|---|---|---|---|
| Solids Ratio (A:B) | 0:100 | 25:75 | 50:50 | 75:25 | 100:0 |
| Gel Time (@ 121° C., min.) | 12.7 | 8.1 | 11.5 | 14.5 | 99.0* |

*Test residue still soluble in acetone without gel particles.

EXAMPLE 2

The polymer of the present invention was prepared by charging a 2-liter flask equipped with an agitator, reflux condenser, dropping funnel and thermometer, with 49 parts of part B resole with 51 parts of part A, both prepared as in Example 1, and agitating the mixture for 15 minutes until homogeneous. A sample was then taken with the following specifications: solids 66-68%, viscosity (@ 25° C.) Q-V, and gel time (@ 121° C., min.) 7-9. The mixture was then charged with 6.7 parts of powdered zinc borate and mixed again until homogeneous. Sampling this latter mixture provided the following specifications: solids 68-70% and gel time (@ 121° C., min.) 7-9.

EXAMPLE 3

A polymer (hereinafter Type I), prepared according to Example 2 was incorporated as the resin in a resin/fiberglass laminate in which several layers of fiberglass fabric were first impregnated with the polymer formulation, pressed under 100 psi at 325° F. until cured. The formulation for the Type I polymer was 47.8% part A, 45.9% part B and 6.3% zinc borate. The resulting laminate was tested for mechanical and thermal properties against another resin fiberglass laminate (Type II polymer), using the same number of layers of the same fiberglass cloth impregnated with a resorcinol/furfural prepolymer mix and cured at 300° F. The resorcinol/furfural composition for this Type II polymer was 33.1% resorcinol, 57.8% furfural and 9.1% zinc borate. The comparative results are shown in the following table:

|  | Resin Type | |
| --- | --- | --- |
|  | Type I | Type II |
| Propane Torch Test | | |
| Afterburn, sec. | 5 | 1 |
| Flammable gas | none | none |
| Smoke | none | none |
| Two Foot Tunnel Test (ASTM D3806-79) | | |
| Flame spread | 0 | 0 |
| Flame spread rating | Class A | Class A |
| Tensile strength $\times 10^3$ psi | 53.4 | 25.9 |
| Tensile modulus $\times 10^3$ psi | 4.02 | 3.92 |
| Compressive strength $\times 10^3$ psi | 41.3 | 30.2 |
| Flexural strength $\times 10^3$ psi | 71.8 | 33.6 |
| Shear strength $\times 10^3$ psi | 4.9 | 2.98 |

EXAMPLE 4

A Type I polymer prepared according to Example 3 was incorporated into a syntactic foam by mixing 40.6 parts of the polymer with 27.2 parts of glass microspheres, plus sufficient solvent to facilitate blending, and then drying at 40°-60° C. to remove excess volatiles. The resulting mixture was charged to a mold, densified to 21-22 lbs/ft$^3$ and cured at 325° F. The resulting polymer foam (hereinafter also designated Type I) was tested for mechanical and thermal properties against another syntactic foam (hereinafter designated Type II) prepared by mixing 52.2 parts of a Type II polymer prepared according to Example 3, with 22.3 parts of glass microspheres plus sufficient solvent to facilitate blending, and then drying at 40°-60° C. to remove excess volatiles. The resulting mixture was charged to a mold, densified at 21-22 lbs/ft$^3$ and cured at 300° F. The results of the comparative test are shown in the following table:

|  | Foam Type | |
| --- | --- | --- |
| Two-foot Tunnel Test | Type I | Type II |
| Flame spread | 0 | 0 |
| Flame spread rating | Class A | Class A |
| Flatwise tensile, psi | 307 | 155 |

It will be seen from the foregoing that the polymer of the present invention provides fire retardant properties quite similar to those of prior art thermosets, but combined with superior mechanical strengths, particularly when fabricated into reinforced laminates and syntactic foams.

It should be noted that only water of reaction and the solvents, such as methanol, used to control viscosity, are eliminated during B-stage oven drying of articles incorporating the polymer of the present invention. Consequently, the solid resin deposited on a reinforcing scrim or fabric, such as fiberglass, has a substantially constant composition, unlike resins deposited in situ from mixtures that lose monomer, such as furfural, during B-stage drying. Thus, a further advantage in processing such scrims or fabrics with the resins of the present invention is that a wide array of volatile contents and flow properties can be easily obtained due to the cure characteristics of a polymer of constant composition.

Since certain changes may be made in the above described materials and processes without departing from the scope of the invention herein involved, it is intended that all matter contained in the above description shall be interpreted as illustrative and not in a limiting sense.

What is claimed is:

1. Method of forming a flame retardant thermoset polymer, said method comprising the steps of:
   reacting moieties of a solution of a polyhydric phenol with a first aldehyde in a molar ratio of one mole of said polyhydric phenol with less than one mole of said first aldehyde, in the presence of sufficient alkaline catalyst to provide a liquid condensation polymerization resin having a molar excess of said polyhydric phenol;
   reacting moieties of a solution of a second aldehyde and a second phenol in a ratio of one mole of phenol with more than one mole of said second aldehyde, in the presence of sufficient alkaline catalyst to provide a condensation polymerization reaction product in the form of a resole;
   mixing said resin and said resole together with a comminuted oxyborate, and heating the resulting mixture for a time and at a temperature sufficient to effect polymerization of said resole and resin into said thermoset polymer.

2. Method of forming a polymer according to claim 1 wherein said polyhydric phenol is selected from the group consisting of resorcinol and substituted resorcinols, to which a minor amount of orthocresol, metacresol, paracresol or 3,5 dimethylphenol has been added.

3. Method of forming a polymer according to claim 1 wherein said first aldehyde is selected from the group consisting of furfural and mixtures of furfural and paraformaldehyde or formalin.

4. Method of forming a polymer according to claim 1 wherein said second phenol is selected from the group consisting of phenol, substituted phenols including xylenol, and cresols.

5. Method of forming a polymer according to claim 1 wherein said second aldehyde is selected from the group consisting of formaldehyde, formalin, acetaldehyde, acrolein and other aldehydes substituted in the alpha position.

6. Method of forming a polymer according to claim 1 wherein said alkaline catalysts are selected from the group consisting of aqueous solutions of NaOH, KOH, Ba(OH)$_2$, NH OH, and primary, secondary and tertiary amines, including methylamines and ethanolamines.

7. Method of forming a polymer according to claim 1 wherein said oxyborate is mixed in an amount in the range of about 3 to 20 weight percent of the final polymer.

8. Method of forming a polymer according to claim 1 wherein said temperature is in the range of between about 175° to 350° F.

9. Method of forming a polymer according to claim 1 including the steps of foaming said mixture of resin, resole and oxyborate so that when heated, polymerization of said mixture produces a substantially rigid foam.

10. Method of forming a polymer according to claim 1 including the steps of impregnating one or more layers of a reinforcing fibrous scrim with the mixture of resole, resin and oxyborate and laminating said layers together under pressure so that when said mixture is heated, polymerization thereof with said scrim produces a reinforced laminate.

11. A flame retardant polymeric material comprising a heat-cured mixture of
(1) a liquid condensation reaction product of a mixture of a first aldehyde and a polyhydric phenol in a molar ratio of one mole of said polyhydric phenol with less than one mole of said first aldehyde and reacted in the presence of an alkaline catalyst;
(2) a liquid condensation reaction product of a mixture of a second aldehyde and a second phenol in a ratio of one mole of phenol with more than a mole of said second aldehyde and reacted in the presence of an alkaline catalyst; and
(3) a comminuted oxyborate.

12. A flame retardant polymeric material as defined in claim 11 and comprising one or more layers of reinforcing scrim embedded in said heat-cured mixture.

13. A flame retardant polymeric material as defined in claim 11 wherein said heat-cured mixture is a foam.

14. A flame retardant polymeric material as defined in claim 11 wherein said heat cured mixture includes a plurailty of glass microspheres.

* * * * *

UNITED STATES PATENT AND TRADEMARK OFFICE
CERTIFICATE OF CORRECTION

PATENT NO. : 4,820,576
DATED     : April 11, 1989
INVENTOR(S) : Harold E. Duryea It is certified that error appears in the above-identified patent and that said Letters Patent is hereby corrected as shown below:

Column 1, line 27, delete "polyphenylguinox lines" and substitute therefor -- polyphenylquinoxalines --.

Claim 6, column 7, line 1, delete "NH OH" and substitute therefor -- $NH_4OH$ --.

Signed and Sealed this

Seventh Day of November, 1989

*Attest:*

JEFFREY M. SAMUELS

*Attesting Officer*     *Acting Commissioner of Patents and Trademarks*